United States Patent
Watanabe et al.

(10) Patent No.: US 8,714,013 B2
(45) Date of Patent: May 6, 2014

(54) ACCELERATION DETECTOR, ACCELERATION DETECTING DEVICE, INCLINATION SENSOR, INCLINATION SENSOR DEVICE, AND ELECTRONIC DEVICE

(75) Inventors: Jun Watanabe, Matsumoto (JP); Kazuyuki Nakasendo, Shiojiri (JP)

(73) Assignee: Seiko Epson Corporation (JP)

( * ) Notice: Subject to any disclaimer, the term of this patent is extended or adjusted under 35 U.S.C. 154(b) by 224 days.

(21) Appl. No.: 13/415,136

(22) Filed: Mar. 8, 2012

(65) Prior Publication Data

US 2012/0227274 A1    Sep. 13, 2012

(30) Foreign Application Priority Data

Mar. 11, 2011 (JP) ................ 2011-054013

(51) Int. Cl.
*G01P 15/10* (2006.01)
*G01P 15/02* (2013.01)
*G01C 9/06* (2006.01)

(52) U.S. Cl.
USPC .................. 73/514.01; 73/514.35; 73/514.37; 33/366.11

(58) Field of Classification Search
USPC ............... 33/365, 366.11; 73/514.01, 514.35, 73/514.37
See application file for complete search history.

(56) References Cited

U.S. PATENT DOCUMENTS

| | | | |
|---|---|---|---|
| 4,881,408 A | 11/1989 | Hulsing, II et al. | |
| 4,939,935 A | 7/1990 | Amand | |
| 5,020,370 A | 6/1991 | Deval et al. | |
| 5,303,589 A * | 4/1994 | Reidemeister et al. | 73/497 |
| 5,331,853 A * | 7/1994 | Hulsing, II | 73/514.29 |
| 5,331,854 A * | 7/1994 | Hulsing, II | 73/514.37 |
| 5,644,083 A * | 7/1997 | Newell et al. | 73/514.29 |
| 5,686,711 A * | 11/1997 | Yamamoto | 200/61.48 |
| 6,263,736 B1 * | 7/2001 | Thundat et al. | 73/514.36 |
| 6,634,231 B2 * | 10/2003 | Malametz | 73/514.01 |
| 7,802,475 B2 * | 9/2010 | Nishizawa et al. | 73/514.29 |
| 2011/0174075 A1 * | 7/2011 | Watanabe et al. | 73/514.34 |
| 2012/0304769 A1 * | 12/2012 | Watanabe et al. | 73/514.01 |
| 2013/0104677 A1 * | 5/2013 | Watanabe et al. | 73/865.8 |
| 2013/0167669 A1 * | 7/2013 | Watanabe et al. | 73/865 |
| 2013/0263661 A1 * | 10/2013 | Watanabe | 73/504.12 |

FOREIGN PATENT DOCUMENTS

| | | | |
|---|---|---|---|
| JP | 01-302166 | | 12/1989 |
| JP | 06026943 A | * | 2/1994 |
| JP | 2011-064652 | | 3/2011 |

\* cited by examiner

*Primary Examiner* — Christopher Fulton
(74) *Attorney, Agent, or Firm* — Harness, Dickey & Pierce, P.L.C.

(57) ABSTRACT

An acceleration detector includes a base portion, a plate-like movable portion connected to the base portion via a joint portion, an acceleration detecting element laid over the base portion and the movable portion, and a supporting portion having a part extending along the movable portion from the base portion, as viewed in a plan view. A mass portion partly overlapping the supporting portion, as viewed in a plan view, is arranged on at least one of two main surfaces of the movable portion. The movable portion is displaceable about the joint portion as a fulcrum in a direction intersecting the main surface according to an acceleration applied in the direction intersecting the main surface. A space is provided between the mass portion and the supporting portion in an area where the mass portion and the supporting portion overlap each other.

16 Claims, 6 Drawing Sheets

FIG. 6

ACCELERATION DETECTOR, ACCELERATION DETECTING DEVICE, INCLINATION SENSOR, INCLINATION SENSOR DEVICE, AND ELECTRONIC DEVICE

BACKGROUND

1. Technical Field

The present invention relates to an acceleration detector, and an acceleration detecting device and an electronic device with this acceleration detector.

2. Related Art

JP-A-1-302166 discloses a pendulum accelerometer (hereinafter referred to as acceleration detector) including a base, a pendulum rotation mass which is connected to the base via a hinge joint and can rotate about the hinge joint as a rotation axis, and a sensor unit which mediates the rotation mass to the base.

The acceleration detector is configured so that, as the rotation mass (hereinafter referred to as movable portion) rotates (hereinafter referred to as displacement) according to an acceleration applied, tensile stress or compressive stress is applied to the sensor unit (hereinafter referred to as acceleration detecting element) and thus causes change in resonance frequency of the acceleration detecting element, and the acceleration is detected based on the change.

In the acceleration detector, the displacement of the movable portion is regulated by a container (hereinafter referred to as package) housing the acceleration detector. That is, since the acceleration detector itself has no components for regulating the displacement of the movable portion, the movable portion and the acceleration detecting element are displaceable until these parts collide with an inner surface of the package.

Since the regulation of the displacement of the movable portion in the acceleration detector thus depends on the package as an external member, the space between the movable portion and the inner surface of the package may significantly differ from a preset value because of a number of dimensional tolerance factors related to the space between the movable portion (acceleration detecting element) and the inner surface of the package (for example, dimensional variation between respective components constituting the package, variation in fixing position of the acceleration detector to the package, and the like).

Therefore, in the acceleration detector, if the space between the movable portion and the inner surface of the package is larger than the preset value, the movable portion or the acceleration detecting element may collide hard with the inner surface of the package and may be damaged, depending on the magnitude of the acceleration applied.

Moreover, in the acceleration detector, if the space between the movable portion and the inner surface of the package is larger than the preset value, the movable portion or the acceleration detecting element may be damaged by displacement exceeding a limit of strength even though these parts do not collide with the inner surface of the package depending on the magnitude of the acceleration applied.

Meanwhile, in the acceleration detector, if the space between the movable portion and the inner surface of the package is smaller than the preset value, the displacement range of the movable portion is smaller than a preset range and therefore a preset acceleration detection range may not be covered.

SUMMARY

An advantage of some aspects of the invention is to solve at least a part of the problems described above, and the invention can be implemented as the following forms or application examples.

Application Example 1

This application example of the invention is directed to an acceleration detector including a base portion, a plate-like movable portion connected to the base portion via a joint portion, an acceleration detecting element laid over the base portion and the movable portion, a supporting portion having a part extending along the movable portion from the base portion, as viewed in a plan view, and a mass portion arranged on at least one of two main surfaces of the movable portion in such a manner that a part of the mass portion overlaps the supporting portion, as viewed in a plan view. A space is provided between the mass portion and the supporting portion in an area where the mass portion and the supporting portion overlap each other so that the movable portion is displaceable about the joint portion as a fulcrum in a direction intersecting the main surface according to an acceleration applied in the direction intersecting the main surface.

According to this application example, in the acceleration detector, the mass portion partly overlapping the supporting portion, as viewed in a plan view, is arranged. The movable portion is displaceable about the joint portion as a fulcrum in the direction intersecting the main surface according to the acceleration applied. A space is provided between the mass portion and the supporting portion in the area where these portions overlap each other.

Therefore, in the acceleration detector, as the mass portion arranged on the main surface of the movable portion contacts the supporting portion when the movable portion is displaced by the amount of the space, the displacement of the movable portion which is displaced according to the acceleration can be regulated within a predetermined range.

Consequently, since a component which regulates the displacement of the movable portion (hereinafter referred to as stopper) is provided within the acceleration detector itself, the displacement of the movable portion can be regulated without depending on a package which is an external member.

Thus, with the acceleration detector, for example, the space between an inner surface of the package and the acceleration detector can be set to be larger than the space between the mass portion and the supporting portion. Therefore, damage of the movable portion and the acceleration detecting element due to collision with the inner surface of the package or displacement exceeding a limit of strength, as seen in the related art, can be avoided.

Moreover, in the acceleration detector, there are no additional variation factors such as dimensional variation (dimensional tolerance) of external members, other than the variation in the space between the mass portion and the supporting portion.

Therefore, in the acceleration detector, the variation in the space between the mass portion and the supporting portion can be made smaller than the variation in the space between the inner surface of the package and the acceleration detector of the related art.

Thus, the acceleration detector can avoid such an inconvenience that the displacement of the movable portion is regulated within a narrower range than a preset range, causing inability to cover a preset acceleration detection range, as seen in the related art.

Moreover, since the stopper which regulates the displacement of the movable portion is provided in the acceleration detector itself, the degree of regulating the displacement of the movable portion can be confirmed, for example, before the acceleration detector is housed in an external member such as a package, which is impossible with the configuration of the related art.

Thus, compared with the related art, the rate of quality products of the acceleration detector is significantly improved and inconveniences such as damage in actual use can be reduced.

Application Example 2

In the acceleration detector according to the above application example, it is preferable that the supporting portion is in a frame shape surrounding the movable portion together with the base portion, as viewed in a plan view.

According to this application example, in the acceleration detector, since the supporting portion is formed in a frame shape surrounding the movable portion together with the base portion, as viewed in a plan view, the strength (impact resistance) of the supporting portion at the time of contact (collision) of the mass portion can be improved, for example, compared with the case where the supporting portion is divided on both sides of the movable portion.

Moreover, in the acceleration detector, since the supporting portion is formed in a frame shape surrounding the movable portion together with the base portion, as viewed in a plan view, the acceleration detector can be fixed to an external member such as a package, in a stable state without deformation of the shape, for example, compared with the case where the supporting portion is divided on both sides of the movable portion.

Thus, in the acceleration detector, change in the variation in the space between the mass portion and the supporting position at the time of fixing the acceleration detector to an external member such as a package can be restrained.

Application Example 3

In the acceleration detector according to the above application example, it is preferable that the supporting portion has plural fixed portions and that the acceleration detector has a center of gravity situated within a range formed by connecting the fixed portions that are next to each other or on a straight line formed by connecting the fixed portions that are next to each other, as viewed in a plan view.

According to this application example, in the acceleration detector, the supporting portion has plural fixed portions, and the center of gravity of the acceleration detector is situated within a range formed by connecting the fixed portions that are next to each other or on a straight line formed by connecting the fixed portions that are next to each other.

Therefore, the acceleration detector can be fixed to an external member such as a package, in a stable posture without being inclined in any direction.

Application Example 4

In the acceleration detector according to the above application example, it is preferable that the acceleration detecting element includes an acceleration detecting portion having at least one or more resonating beam which extends along a direction connecting the base portion and the movable portion, and a pair of basal parts connected to both ends of the acceleration detecting portion, and that one of the basal parts is fixed to the base portion and the other of the basal parts is fixed to the movable portion.

According to this application example, in the acceleration detector, the acceleration detecting element includes an acceleration detecting portion having at least one or more resonating beam, and a pair of basal parts connected to both ends of the acceleration detecting portion. One of the basal parts is fixed to the base portion and the other of the basal parts is fixed to the movable portion.

Therefore, the acceleration detector can be configured in such a manner that the resonating beam expands and contracts, for example, according to the displacement of the movable portion due to the acceleration applied, and then change in resonation frequency of the resonating beam due to tensile stress or compressive stress generated at this time is converted to acceleration.

This configuration, which enables the acceleration detector to regulate the displacement of the movable portion on its own, can be considered more effective in that impact on the acceleration detecting element with the resonating beam is relaxed and hence damage of the acceleration detecting element is avoided.

Application Example 5

This application example of the invention is directed to an acceleration detecting device including the acceleration detector according to the above application example, and a package which houses the acceleration detector.

According to this application example, since the acceleration detecting device includes the acceleration detector according to the above application example, and the package which houses the acceleration detector, the acceleration detecting device having the advantages of the above application example can be provided.

Application Example 6

This application example of the invention is directed to an electronic device including the acceleration detector according to the above application example.

According to this application example, since the electronic device includes the acceleration detector according to the above application example, the electronic device having the advantages of the above application example can be provided.

BRIEF DESCRIPTION OF THE DRAWINGS

The invention will be described with reference to the accompanying drawings, wherein like numbers reference like elements.

FIGS. 2A and 2B are schematic plan and sectional views showing a schematic configuration of the acceleration detector of the first embodiment. FIG. 2A is a plan view.

FIGS. 3A and 3B are schematic sectional views illustrating operation of the acceleration detector.

FIGS. 4A to 4C are schematic plan and sectional views showing a schematic configuration of an acceleration detector according to a modification. FIG. 4A is a plan view. FIG.

4B is a sectional view along line D-D in FIG. 4A.

FIGS. 5A and 5B are schematic plan and sectional views showing a schematic configuration of an acceleration detecting device of a second embodiment.

DESCRIPTION OF EXEMPLARY EMBODIMENTS

Hereinafter, embodiments of the invention will be described with reference to the drawings.

First Embodiment

First, an example of an acceleration detector will be described.

Figure 1:
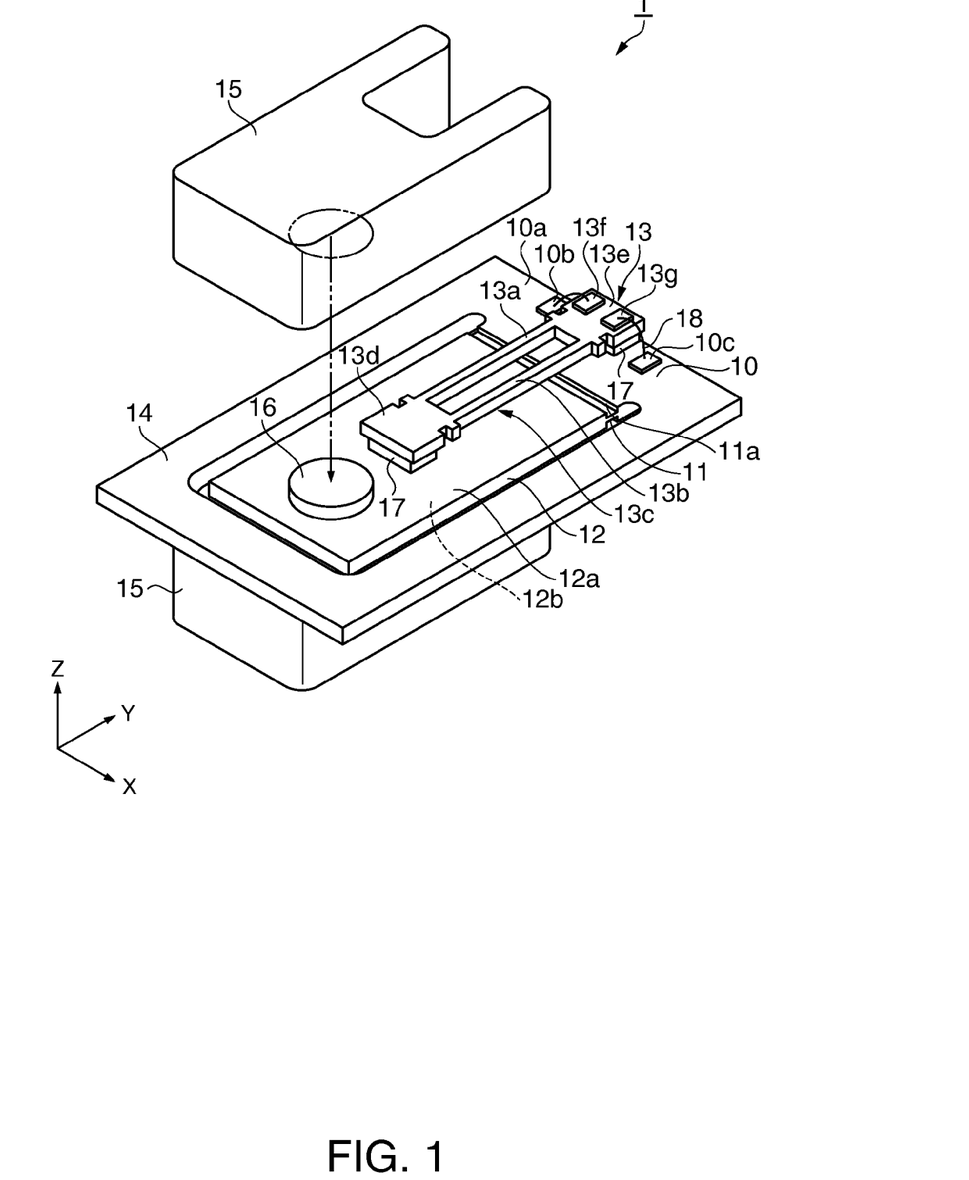
FIG. 1 is a partly exploded schematic perspective view of an acceleration detector of a first embodiment.
Figure 2A:
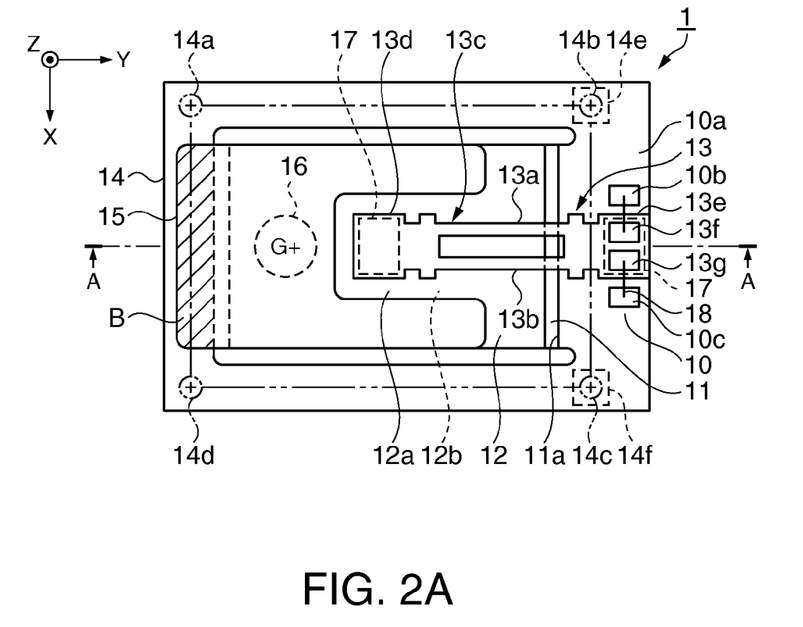
Figure 2B:
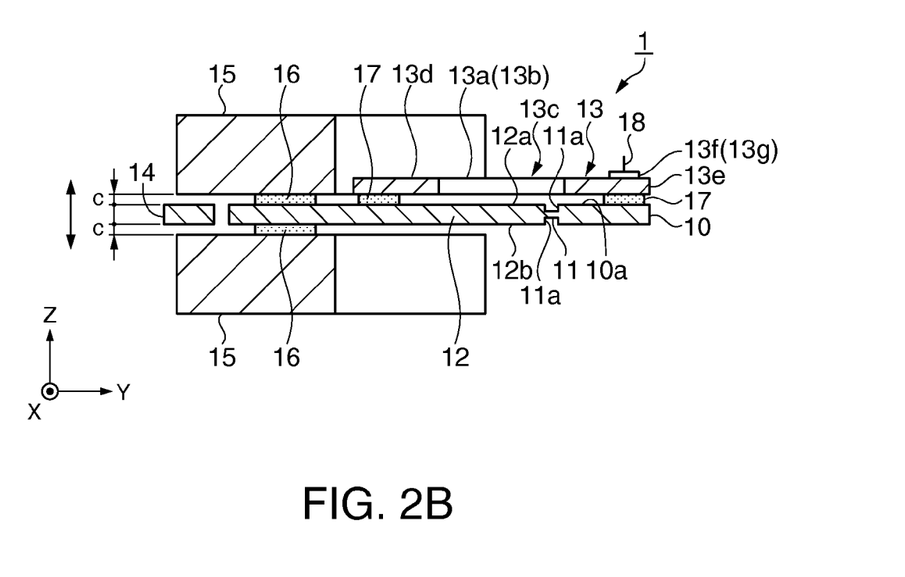
FIG. 2B is a sectional view along line A-A in FIG. 2A.

FIG. 1 is a partly exploded schematic perspective view of an acceleration detector of a first embodiment. FIGS. 2A and 2B are schematic plan and sectional views showing a schematic configuration of the acceleration detector of the first embodiment. FIG. 2A is a plan view. FIG. 2B is a sectional view along line A-A in FIG. 2A. The wiring is not shown and dimensional ratios of components are different from actual ratios.

As shown in FIG. 1 and FIGS. 2A and 2B, an acceleration detector 1 includes a flat plate-like base portion 10, a rectangular flat plate-like movable portion 12 connected to the base portion 10 via a joint portion 11, and an acceleration detecting element 13 laid over the base portion 10 and the movable portion 12.

The acceleration detector 1 also has a flat plate-like supporting portion 14 which extends on both sides of the movable portion 12 from the base portion 10, as viewed in a plan view, and which is formed in a substantially rectangular frame shape surrounding the movable portion 12 together with the base portion 10.

On both main surfaces 12a and 12b of the movable portion 12 equivalent to face and back sides of a flat plate, a pair of mass portions (weight portions) 15 is arranged partly overlapping the supporting portion 14, as viewed in a plan view. The mass portions 15 are fixed to the main surfaces 12a and 12b via an adhesive 16.

The base portion 10, the joint portion 11, the movable portion 12 and the supporting portion 14 are integrally formed substantially in a flat plate shape, for example, using a crystal substrate cut out of a crystal core or the like at a predetermined angle. Between the movable portion 12 and the supporting portion 14, a slit-like hole separating these portions is provided.

The outer shape of the base portion 10, the joint portion 11, the movable portion 12 and the supporting portion 14 is formed with high precision by a technique such as photolithography or etching.

On the joint portion 11, a groove portion 11a is formed along a direction (X-axis direction) orthogonal to a direction (Y-axis direction) connecting the base portion 10 and the movable portion 12 so as to divide the base portion 10 and the movable portion 12, by half etching from the side of the two main surfaces 12a and 12b.

A sectional shape of the joint portion 11 along the Y-axis direction (the shape in FIG. 2B) is substantially H-shaped by the groove portion 11a.

The joint portion 11 enables the movable portion 12 to be displaced (rotated) in a direction (Z-axis direction) intersecting the main surface 12a about the joint portion 11 as a fulcrum (rotation axis) according to the acceleration applied in the direction (Z-axis direction) intersecting the main surface 12a (12b).

For the mass portions 15, a material with a relatively high specific gravity represented by, for example, Cu or Au, is used.

The mass portions 15 are formed substantially in a U-shape, as viewed in a plan view, extending in a bifurcated form avoiding the acceleration detecting element 13 to the vicinity of the joint portion 11 from a free end side of the movable portion 12 opposite to the joint portion 11, in order to maximize the plane size.

As the adhesive 16, for example, a silicone resin-based thermosetting adhesive is used. The adhesive 16 is preferably applied to glue a certain area of the movable portion 12 and the mass portions 15 in view of restraining thermal stress.

In the acceleration detector 1, in an area B where the mass portions 15 and the supporting portion 14 overlap each other (the crosshatched part in FIG. 2A), a space C is provided between the mass portions 15 and the supporting portion 14, as shown in FIG. 2B. In this embodiment, the space C is controlled by the thickness of the adhesive 16.

Specifically, for example, the movable portion 12 and the mass portions 15 are fixed by the adhesive 16 in the state where a spacer formed with a predetermined thickness corresponding to the space C is sandwiched between these portions. Thus, the space C can be controlled within a predetermined range.

The acceleration detecting element 13 includes an acceleration detecting portion 13c having resonating beams 13a and 13b which are at least one or more (in this example, two) rectangular pillars extending along the direction (Y-axis direction) connecting the base portion 10 and the movable portion 12 and generate bending resonation in the X-axis direction, and a pair of basal parts 13d and 13e connected to both ends of the acceleration detecting portion 13c.

The acceleration detecting element 13 is also called double-ended tuning fork element (double-ended tuning fork-like resonating reed) because the two resonating beams 13a and 13b and the pair of basal parts 13d and 13e form two sets of tuning forks.

In the acceleration detecting element 13, the acceleration detecting portion 13c and the basal parts 13d and 13e are integrally formed substantially in a flat plate shape, for example, using a crystal substrate cut out of a crystal ore or the like at a predetermined angle. The outer shape of the acceleration detecting element 13 is shaped with high precision, using a technique such as photolithography or etching.

In the acceleration detecting element 13, the one basal part 13d is fixed to the side of the main surface 12a of the movable portion 12, for example, via a joining member 17 such as a low-melting glass or Au/Sn alloy coating capable of eutectic bonding, and the other basal part 13e is fixed to the side of a main surface 10a of the base portion 10 (the same side as the main surface 12a of the movable portion 12) via a joining member 17.

Between the acceleration detecting element 13, and the main surface 10a of the base portion 10 and the main surface 12a of the movable portion 12, a predetermined space is provided so that the acceleration detecting element 13 does not contact the base portion 10 and the movable portion 12 when the movable portion 12 is displaced. In this embodiment, this space is controlled by the thickness of the joining member 17. The same controlling method as with the space C can be used.

Extraction electrodes 13f and 13g of the acceleration detecting element 13, extracted to the basal part 13e from excitation electrodes (driven electrodes) not shown of the resonating beams 13a and 13b, are connected to connection terminals 10b and 10c provided on the main surface 10a of the base portion 10 via a metallic wire 18 of, for example, Au, Al or the like.

Specifically, the extraction electrode 13f is connected to the connection terminal 10b. The extraction electrode 13g is connected to the connection terminal 10c.

The connection terminals 10b and 10c of the base portion 10 are connected to external connection terminals 14e and 14f of the supporting portion 14 via wiring, not shown. Specifically, the connection terminal 10b is connected to the external connection terminal 14e. The connection terminal 10c is connected to the external connection terminal 14f.

The excitation electrodes, the extraction electrodes 13f and 13g, the connection terminals 10b and 10c, and the external connection terminals 14e and 14f are configured, for example, with a Cr underlying layer with an Au layer stacked thereon.

The supporting portion 14 has plural (in this example, four) fixed portions 14a, 14b, 14c and 14d, which are portions fixed to external members such as a package and a substrate. The fixed portions 14a to 14d are arranged in such a manner that the center of gravity G of the acceleration detector 1 is situated within a range formed by connecting the neighboring fixed portions, as viewed in a plan view (within a range surrounded by lines that connecting the neighboring fixed portions but not intersecting each other, for example, within the range surrounded by double-dotted chain lines in FIG. 2A).

If there are two fixed portions, the two fixed portions may be arranged in such a manner that the center of gravity G is situated on a straight line connecting the fixed portions.

Now, the operation of the acceleration detector 1 will be described.

Figure 3A:
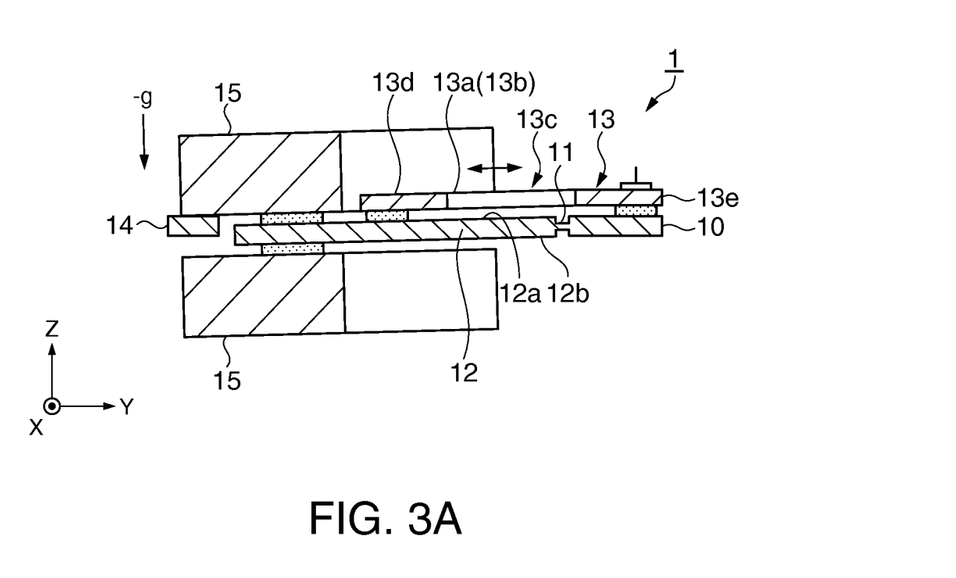
FIG. 3A shows the state where a movable portion is displaced in −Z direction.
Figure 3B:
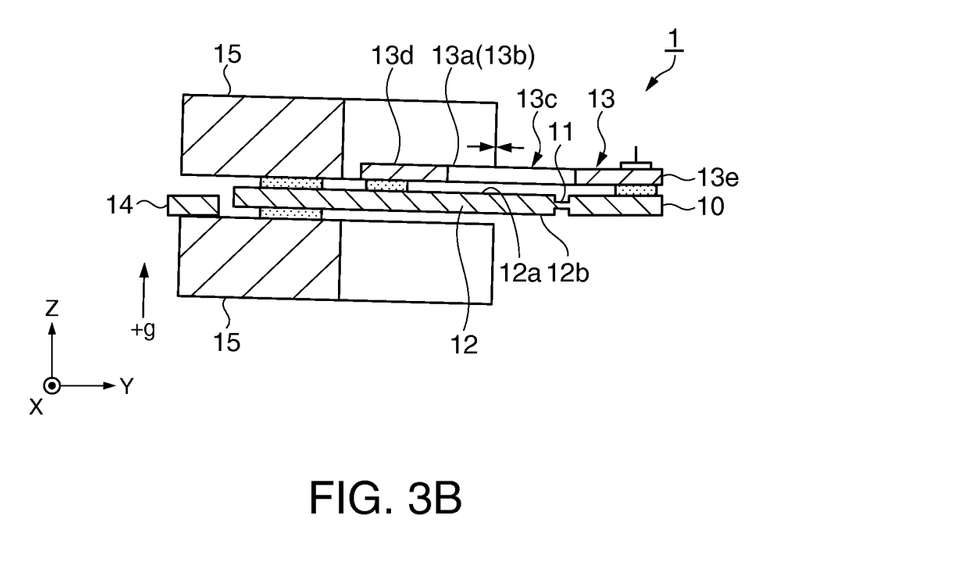
FIG. 3B shows the state where the movable portion is displaced in +Z direction.

FIGS. 3A and 3B are schematic sectional views illustrating the operation of the acceleration detector. FIG. 3A shows the state where the movable portion is displaced downward on the sheet (−Z direction). FIG. 3B shows the state where the movable portion is displaced upward on the sheet (+Z direction).

In the acceleration detector 1, as shown in FIG. 3A, when the movable portion 12 is displaced in the −Z direction about the joint portion 11 as a fulcrum according to an acceleration −g applied in the Z-axis direction, a tensile force in a direction such that the basal parts 13d and 13e move away from each other in the Y-axis direction is applied to the acceleration detecting element 13, and tensile stress is generated in the resonating beams 13a and 13b of the acceleration detecting portion 13c.

Thus, a change occurs in the acceleration detector 1 so that the resonation frequency (hereinafter also referred to as resonance frequency) of the resonating beams 13a and 13b of the acceleration detecting portion 13c becomes higher, for example, like reeled-up strings of a string instrument.

Meanwhile, in the acceleration detector 1, as shown in FIG. 3B, when the movable portion 12 is displaced in the +Z direction about the joint portion 11 as a fulcrum according to an acceleration +g applied in the Z-axis direction, a compressive force in a direction such that the basal parts 13d and 13e move toward each other in the Y-axis direction is applied to the acceleration detecting element 13, and compressive stress is generated in the resonating beams 13a and 13b of the acceleration detecting portion 13c.

Thus, a change occurs in the acceleration detector 1 so that the resonance frequency of the resonating beams 13a and 13b of the acceleration detecting portion 13c becomes lower, for example, like reeled-out strings of a string instrument.

The acceleration detector 1 detects the change in the resonance frequency. The acceleration (+g, −g) applied in the Z-axis direction is derived by conversion to a numeric value defined by a look-up table or the like according to the proportion of the detected change in the resonance frequency.

Here, in the acceleration detector 1, if the acceleration −g applied in the Z-axis direction is greater than a predetermined magnitude, as shown in FIG. 3A, a part overlapping the supporting portion 14, as viewed in a plan view, of the mass portion 15 fixed to the main surface 12a of the movable portion 12 contacts the supporting portion 14.

Thus, in the acceleration detector 1, the displacement of the movable portion 12 displaced in the −Z direction according to the acceleration −g is regulated within a predetermined range (corresponding to the space C; see FIG. 2B).

Meanwhile, in the acceleration detector 1, if the acceleration +g applied in the Z-axis direction is greater than a predetermined magnitude, as shown in FIG. 3B, a part overlapping the supporting portion 14, as viewed in a plan view, of the mass portion 15 fixed to the main surface 12b of the movable portion 12 contacts the supporting portion 14.

Thus, in the acceleration detector 1, the displacement of the movable portion 12 displaced in the +Z direction according to the acceleration +g is regulated within a predetermined range (corresponding to the space C; see FIG. 2B).

As described above, in the acceleration detector 1 of the first embodiment, the mass portions 15 partly overlapping the supporting portion 14, as viewed in a plan view, are arranged on the both main surfaces 12a and 12b of the movable portion 12. The movable portion 12 is displaceable in the Z-axis direction about the joint portion 11 as a fulcrum according to the acceleration (+g, −g) applied in the Z-axis direction. The space C is provided between the mass portions 15 and the supporting portion 14 in the area B where the mass portions 15 and the supporting portion 14 overlap each other.

Therefore, in the acceleration detector 1, as the mass portions 15 fixed to the two main surfaces 12a and 12b of the movable portion 12 are displaced by the amount of the space C and thus contact the supporting portion 14, the displacement of the movable portion 12 displaced in the Z-axis direction according to the acceleration can be regulated within a predetermined range.

Consequently, since the acceleration detector 1 itself has a stopper for regulating the displacement of the movable portion 12, the acceleration detector 1 itself can regulate the displacement of the movable portion 12 without depending on, for example, the package, which is an external member.

Thus, for example, the space between the inner surface of the package, which is an external member, and the acceleration detector 1 can be set to be sufficiently larger than the space C between the mass portions 15 and the supporting portion 14. Therefore, damage of the movable portion 12 and the acceleration detecting element 13 due to collision with the inner surface of the package or displacement exceeding a limit of strength as seen in the related art can be avoided.

Moreover, in the acceleration detector 1, there are no additional variation factors such as dimensional variation (dimensional tolerance) of external members such as a package, other than the variation in the space C between the mass portions 15 and the supporting portion 14.

Therefore, in the acceleration detector 1, the variation in the space C between the mass portions 15 and the supporting portion 14 can be made smaller than the variation in the space between the inner surface of the package and the acceleration detector of the related art.

Thus, the acceleration detector 1 can avoid such an inconvenience that the displacement of the movable portion 12 is regulated within a narrower range than a preset range, causing inability to cover a preset acceleration detection range, as seen in the related art.

Since the acceleration detector 1 itself is provided with a stopper for regulating the displacement of the movable portion 12, the degree of regulation of the displacement of the movable portion 12 can be confirmed before the acceleration detector 1 is housed in an external member such as a package, which is impossible with the configuration of the related art.

Therefore, with the acceleration detector 1, the rate of quality products is significantly improved and inconvenience such as damage in actual use can be reduced.

Also, in the acceleration detector 1, since the supporting portion 14 is formed in a frame shape surrounding the movable portion 12 together with the base portion 10, as viewed in a plan view, the strength (impact resistance) of the supporting portion 14 at the time of contact (collision) of the mass portions 15 can be improved, for example, compared with the case where the supporting portion 14 is divided on both sides of the movable portion 12, as in a modification which will be described later.

Moreover, in the acceleration detector 1, since the supporting portion 14 is formed in a frame shape surrounding the movable portion 12 together with the base portion 10, as viewed in a plan view, the acceleration detector 1 can be fixed to an external member such as a package, in a stable state without deformation of the shape, for example, compared with the case where the supporting portion 14 is divided on both sides of the movable portion 12.

Thus, in the acceleration detector 1, change in the variation in the space C between the mass portions 15 and the supporting position 14 at the time of fixing the acceleration detector 1 to an external member such as a package can be restrained. That is, the acceleration detector 1 can restrain change in the regulation range within which the displacement of the movable portion 12 is regulated.

Also, in the acceleration detector 1, the supporting portion 14 has the fixed portions 14a to 14d at four positions, and the fixed portions 14a to 14d are arranged so that the center of gravity G of the acceleration detector is situated within the range formed by connecting the neighboring fixed portions.

Therefore, the acceleration detector 1 can be fixed to an external member such as a package, in a stable posture without being inclined in any direction.

If the acceleration detector 1 has the fixed portions at two positions, arranging the two fixed portions so that the center of gravity G is situated on a straight line formed by connecting the fixed portions can have the same effect.

Moreover, in the acceleration detector 1, the acceleration detecting element 13 includes the acceleration detecting portion 13c having the two resonating beams 13a and 13b extending along the Y-axis direction, and the pair of basal parts 13d and 13e connected to both ends of the acceleration detecting portion 13c. The one basal part 13d is fixed to the movable portion 12. The other basal part 13e is fixed to the base portion 10.

Therefore, the acceleration detector 1 can be provided with a configuration with high detection sensitivity in which the resonating beams 13a and 13b expand and contract in the Y-axis direction according to the displacement of the movable portion 12 in the Z-axis direction due to the acceleration applied in the Z-axis direction, and then change in the resonance frequency due to tensile stress or compressive stress generated at this time is converted to acceleration.

This configuration, which enables the acceleration detector 1 to regulate the displacement of the movable portion 12 in the Z-axis direction on its own, can be considered more effective in that impact on the acceleration detecting element 13 with the resonating beams 13a and 13b is relaxed and hence damage of the acceleration detecting element 13 is avoided.

In the acceleration detector 1, if the acceleration applied in the Z-axis direction is only in one direction (only +g or only −g), the mass portion 15 that does not contact the supporting portion 14 may have a shape that does not overlap the supporting portion 14, as viewed in a plan view, or the mass portion 15 itself may be eliminated.

Also, in the acceleration detector 1, the acceleration detecting element 13 may be provided on the side of the main surface 12b instead of the side of the main surface 12a of the movable portion 12, or may be provided on both the side of the main surface 12a and the side of the main surface 12b.

Moreover, in the acceleration detector 1, in addition to the adhesive 16, an adhesive may be applied to a portion from the lateral side of the mass portion 15 to the main surface 12a (12b) of the movable portion 12, thus enhancing the adhesive fixing strength between the mass portion 15 and the movable portion 12.

Moreover, in the acceleration detector 1, the extraction electrodes 13f and 13g of the acceleration detecting element 13 may be connected to the connection terminals 10b and 10c of the base portion 10 by an electrically conductive adhesive instead of the metallic wire 18.

These additional features are also applicable to the following modification.

Modification

Next, a modification of the first embodiment will be described.

Figure 4A:
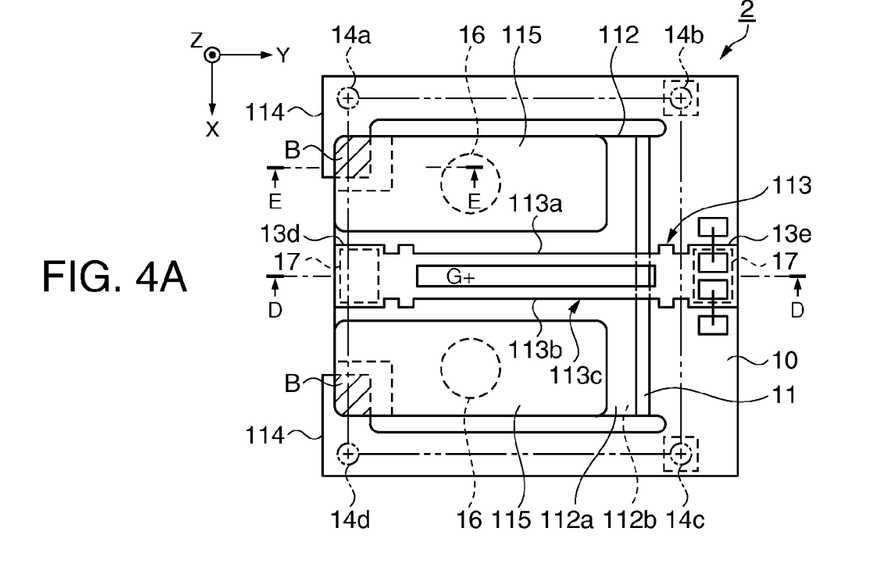
Figure 4B:
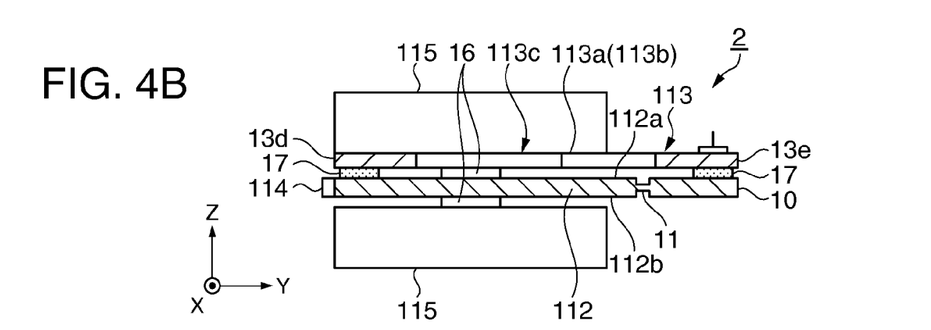
Figure 4C:
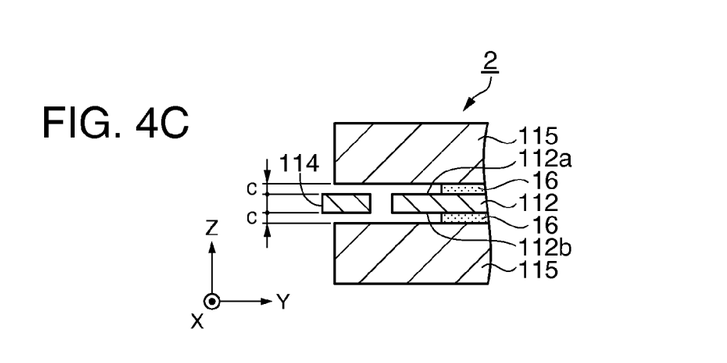
FIG. 4C is a sectional view along line E-E in FIG. 4A.

FIGS. 4A to 4C are schematic plan and sectional views showing a schematic configuration of an acceleration detector according to a modification of the first embodiment. FIG. 4A is a plan view. FIG. 4B is a sectional view along line D-D in FIG. 4A. FIG. 4C is a sectional view along line E-E in FIG. 4A. The wiring is not shown and the dimensional ratios of the components are different from actual ratios.

The same parts as in the first embodiment are denoted by the same reference numerals and will not be described further in detail. Portions that are different from the first embodiment will be mainly described.

As shown in FIGS. 4A to 4C, in an acceleration detector 2, a part of a supporting portion 114 on a free end side (−Y side) of a movable portion 112, which is extended and connected in the X-axis direction in the first embodiment, is cut off except a root part bent from the Y-axis direction to the X-axis direction, and the supporting portion 114 is thus divided into two on the +X side and −X side of the movable portion 112.

Also, in the acceleration detector 2, the free end side of the movable portion 112 is extended into the space cut out of the supporting portion 114.

In the acceleration detector 2, a mass portion 115 is divided into two on the +X side and −X side so that an acceleration detecting element 113 can be arranged at the extended part of the movable portion 112. On the side of a main surface 112a of the movable portion 112, the two divided mass portions 115 are arranged to hold the acceleration detecting element 113 between the mass portions 115 from the +X side and −X side.

Also a mass portion 115 on the side of a main surface 112b of the movable portion 112 is divided into two and arranged to overlap the side of the main surface 112a, as viewed in a plan view.

The mass portions 115 partly overlap the portion (forward end part) of the supporting portion 114 that is bent from the Y-axis direction to the X-axis direction on the free end side of the movable portion 112 (the crosshatched parts in FIG. 4A; areas B).

In the areas B where the mass portions 115 and supporting portion 114 overlap each other, a space C is provided between the mass portions 115 and the supporting portion 114, as shown in FIG. 4C.

The operation of the acceleration detector 2 corresponds to the first embodiment and therefore will not be described further.

In the acceleration detector 2 with the above configuration, the basal part 13e of the acceleration detecting element 113 can be arranged at the same position as in the first embodiment, and the basal part 13d can be moved to and arranged at an end part on the free end side of the movable portion 112.

Therefore, in the acceleration detector 2, resonating beams 113a and 113b of an acceleration detecting portion 113c of the acceleration detecting element 113 can be made longer than in the first embodiment without increasing the size in the Y-axis direction, compared with the first embodiment.

In the acceleration detector 2 of the modification, as described above, since the resonating beams 113a and 113b of the acceleration detecting element 113 can be made longer than in the first embodiment without increasing the size in the Y-axis direction, compared with the first embodiment, the resonating beams 113a and 113b can easily expand and contract with even a slight displacement of the movable portion 112 due to acceleration, and change in resonance frequency can easily occur.

Consequently, in the acceleration detector, without increasing the size in the Y-axis direction compared with the first embodiment, acceleration detection sensitivity can be improved.

Second Embodiment

Next, an acceleration detecting device having the acceleration detector described in the first embodiment and the modification will be described.

Figure 5A:
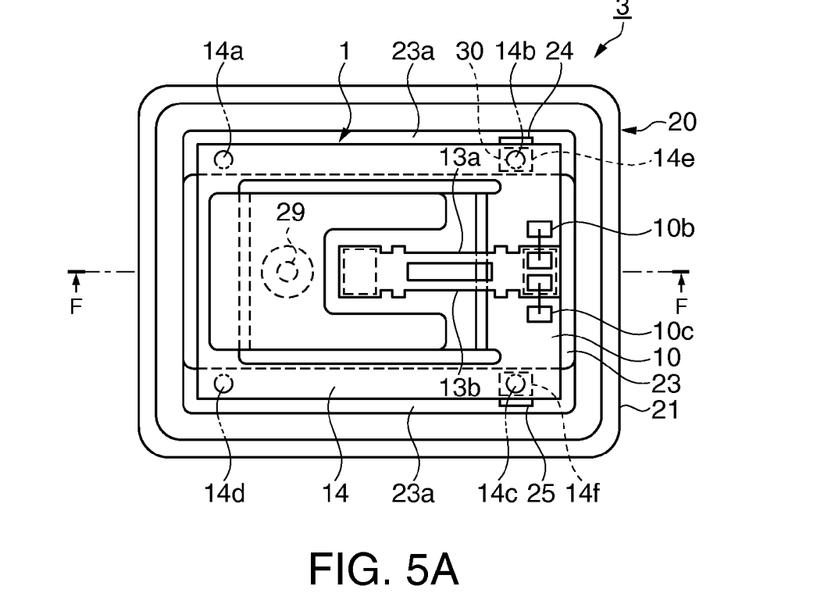
FIG. 5A is a plan view overlooking from a lid (cover) side.
Figure 5B:
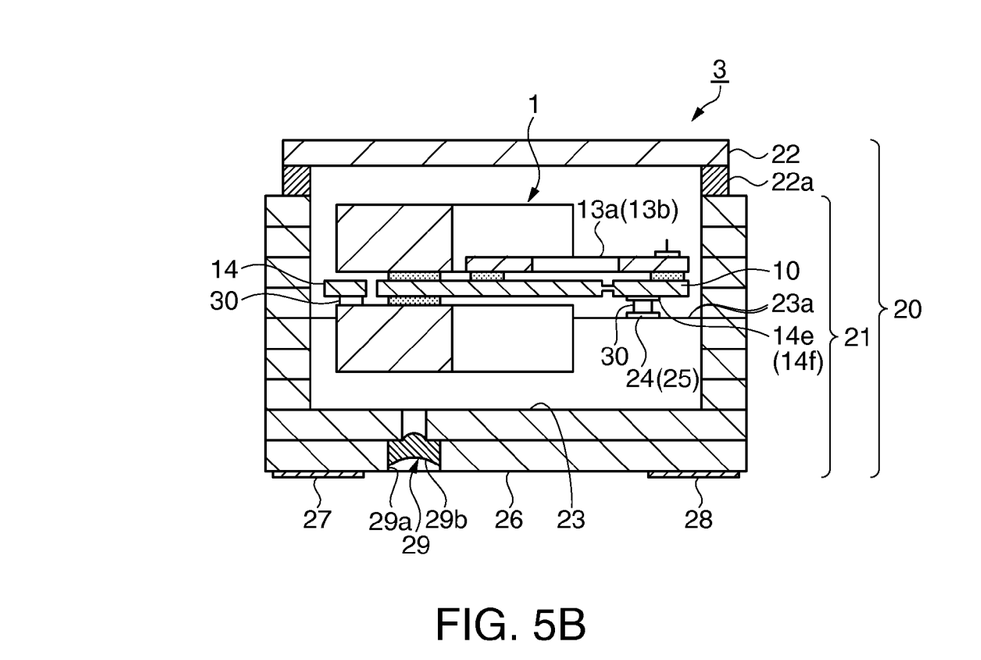
FIG. 5B is a sectional view along line F-F in FIG. 5A.

FIGS. 5A and 5B are schematic plan and sectional views showing a schematic configuration of an acceleration detecting device of a second embodiment. FIG. 5A is a plan view overlooking from a lid (cover) side. FIG. 5B is a sectional view along line F-F in FIG. 5A. The lid is not shown in the plan view. The wiring is not shown, either.

The same parts as in the first embodiment are denoted by the same reference numerals and will not be described further in detail. Portions that are different from the first embodiment will be mainly described.

As shown in FIGS. 5A and 5B, an acceleration detecting device 3 has the acceleration detector 1 described in the first embodiment, and a package 20 housing the acceleration detector 1.

The package 20 includes a package base 21 having a substantially rectangular plane shape and a recessed part, and a flat plate-like lid 22 having a substantially rectangular plane shape for covering the recessed part of the package base 21. The package 20 is thus formed substantially in a rectangular parallelepiped shape.

For the package base 21, an aluminum oxide-based sintered compact formed by shaping, stacking and sintering a ceramic green sheet, or crystal, glass, silicon or the like is used.

For the lid 22, the same material as the package base 21, or a metal such as Kovar, 42 alloy or stainless steel is used.

In the package base 21, internal terminals 24 and 25 are provided at two step parts 23a protruding along an inner wall of the recessed part from an outer circumferential part of an inner bottom surface (bottom surface on the inner side of the recessed part) 23.

The internal terminals 24 and 25 are provided at positions facing the external connection terminals 14e and 14f provided on the supporting portion 14 of the acceleration detector 1 (positions where the internal terminals overlap the external connection terminals, as viewed in a plan view). The external connection terminal 14e is connected to the connection terminal 10b of the base portion 10. The external connection terminal 14f is connected to the connection terminal 10c of the base portion 10.

The external connection terminals 14e and 14f are preferably provided at positions where the external connection terminals overlap the fixed portions 14b and 14c of the supporting portion 14, as viewed in a plan view.

On an outer bottom surface (surface opposite to the inner bottom surface 23; bottom surface on the outer side) 26 of the package base 21, a pair of external terminals 27 and 28 used for mounting on an external member such as an electronic device is formed.

The external terminals 27 and 28 are connected to the internal terminals 24 and 25 via internal wiring, not shown. For example, the external terminal 27 is connected to the internal terminal 24. The external terminal 28 is connected to the internal terminal 25.

The internal terminals 24 and 25 and the external terminals 27 and 28 are made up of a metal film including each coating of Ni, Au or the like stacked on a metalized layer of W by plating or the like.

A sealing portion 29 sealing the inside of the package 20 is provided at a bottom part of the recessed part of the package base 21.

The sealing portion 29 is configured in such a manner that a sealant 29b made of an Au/Ge alloy, solder or the like is introduced into a stepped penetration hole 29a having a greater hole diameter on the side of the outer bottom surface 26 than on the side of the inner bottom surface 23, then the sealant 29b is melted by heating and subsequently solidified, thus airtightly sealing the inside of the package 20.

In the acceleration detecting device 3, the fixed portions 14a, 14b, 14c and 14d of the supporting portion 14 of the acceleration detector 1 are fixed to the step parts 23a of the package base 21 via an adhesive 30.

Here, since the fixed portions 14b and 14c are the portions connecting the external connection terminals 14e and 14f and the internal terminals 24 and 25, a silicone resin-based electrically conductive adhesive containing an electrically conductive material such as a metallic filler is used as the adhesive 30. Meanwhile, to fix the fixed portions 14a and 14d, a silicone resin-based adhesive that does not contain an electrically conductive material such as a metallic filler may be used.

In the acceleration detecting device 3, in the state where the acceleration detector 1 is connected with the internal terminals 24 and 25 of the package base 21, the recessed part of the package base 21 is covered by the lid 22, and the package base 21 and the lid 22 are jointed together by a joining member 20a such as a seam ring, low-melting glass or adhesive.

In the acceleration detecting device 3, after the lid 22 is joined, the sealant 29b is introduced into the penetration hole 29a of the sealing portion 29 in the state where the pressure inside the package 20 is reduced (with a high degree of vacuum). The sealant 29b is melted by heating and then solidified, thereby airtightly sealing the inside of the package 20.

The inside of the package 20 may be filled with an inert gas such as nitrogen, helium or argon.

Both the package base and the lid of the package may have a recessed part.

In the acceleration detecting device 3, the resonating beams 13a and 13b of the acceleration detector 1 oscillate (resonate) at a predetermined frequency in response to a driving signal applied to the excitation electrodes of the acceleration detector 1 via the external terminals 27 and 28, the internal terminals 24 and 25, the external connection terminals 14e and 14f, and the connection terminals 10b and 10c or the like.

The acceleration detecting device 3 outputs the resonance frequency of the acceleration detector 1 which changes according to the acceleration applied, as an output signal.

As described above, since the acceleration detecting device 3 of the second embodiment has the acceleration detector 1, an acceleration detecting device having the advantages that are described in the first embodiment (for example, an acceleration detecting device that can avoid damage of the acceleration detector 1 due to collision with the inner surface of the package 20 or displacement exceeding the limit of strength) can be provided.

Also, if the acceleration detecting device 3 includes the acceleration detector 2 instead of the acceleration detector 1, an acceleration detecting device having similar advantages to those described above and also having the advantages particular to the acceleration detector 2 can be provided.

Third Embodiment

Next, an inclinometer as an electronic device having the acceleration detector described in the embodiments and modification will be described.

Figure 6:
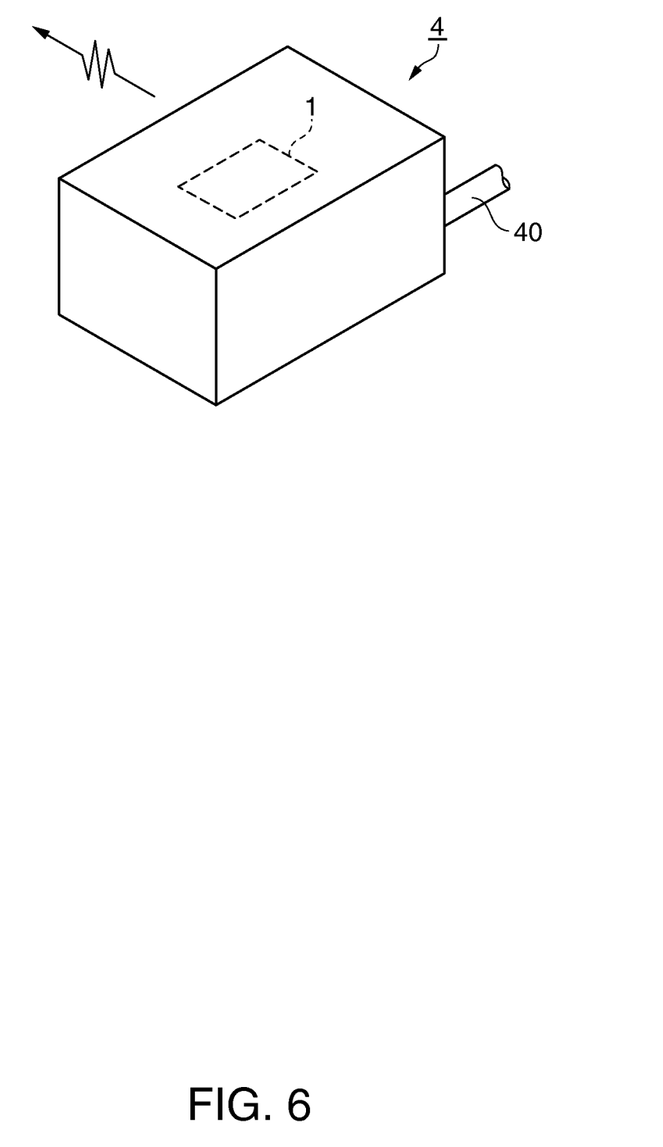
FIG. 6 is a schematic perspective view showing an inclinometer of a third embodiment.

FIG. 6 is a schematic perspective view showing an inclinometer of a third embodiment.

An inclinometer 4 shown in FIG. 6 includes the acceleration detector 1 described in the first embodiment, and an inclination sensor.

The inclinometer 4 is installed in a measuring target place such as a mountain slope, road slope, or retaining wall of embankment. The inclinometer 4 is supplied with power from outside via a cable 40 or includes a power source. A driving signal is sent to the acceleration detector 1 by a driving circuit, not shown.

The inclinometer 4 with a detection circuit, not shown, detects change in the posture of the inclinometer 4 (change in the direction in which gravitational acceleration is applied to the inclinometer 4) based on a resonance frequency which changes according to the gravitational acceleration applied to the acceleration detector 1, converts the detected change to an angle, and transfers its data to a base station, for example, via wireless communication. Thus, the inclinometer 4 can contribute early detection of abnormality.

The inclinometer 4 may include the acceleration detector 2 instead of the acceleration detector 1, as an inclination sensor.

The acceleration detectors 1 and 2 can be suitably used not only as the inclinometer but also as an acceleration sensor and inclination sensor of a seismometer, navigation device, posture control device, game controller, mobile phone and the like. In any of these cases, an electronic device having the advantages described in the embodiments and modification can be provided.

In the embodiments and modification, the material of the base portion, the joint portion, the movable portion and the supporting portion is not limited to crystal and may also be glass or a semiconductor material such as silicon.

The base material of the acceleration detecting element is not limited to crystal and may also be a piezoelectric material such as lithium tantalate ($LiTaO_3$), lithium tetraborate ($Li_2B_4O_7$), lithium niobate ($LiNbO_3$), lead zirconate titanate (PZT), zinc oxide (ZnO) or aluminum nitride (AlN), or a semiconductor material such as silicon with a piezoelectric coating of zinc oxide (ZnO), aluminum nitride (AlN) or the like.

The entire disclosure of Japanese Patent Application No. 2011-054013, filed Mar. 11, 2011 is expressly incorporated by reference herein.

What is claimed is:

1. An acceleration detector comprising:
    a base portion;
    a plate-like movable portion connected to the base portion via a joint portion;
    an acceleration detecting element laid over the base portion and the movable portion;
    a supporting portion having a part extending along the movable portion from the base portion, as viewed in a plan view; and
    a mass portion arranged on at least one of two main surfaces of the movable portion in such a manner that a part of the mass portion overlaps the supporting portion, as viewed in a plan view;
    wherein a space is provided between the mass portion and the supporting portion in an area where the mass portion and the supporting portion overlap each other so that the movable portion is displaceable about the joint portion as a fulcrum in a direction intersecting the main surface according to an acceleration applied in the direction intersecting the main surface.

2. The acceleration detector according to claim 1, wherein the supporting portion is in a frame shape surrounding the movable portion together with the base portion, as viewed in a plan view.

3. An acceleration detecting device comprising:
    the acceleration detector according to claim 2; and
    a package which houses the acceleration detector.

4. The acceleration detector according to claim 1, wherein the supporting portion has plural fixed portions, and the acceleration detector has a center of gravity situated within a range formed by connecting the fixed portions that are next to each other or on a straight line formed by connecting the fixed portions that are next to each other, as viewed in a plan view.

5. The acceleration detector according to claim 1, wherein the acceleration detecting element includes an acceleration detecting portion having at least one or more resonating beam which extends along a direction connecting the base portion and the movable portion, and a pair of basal parts connected to both ends of the acceleration detecting portion, and
    one of the basal parts is fixed to the base portion and the other of the basal parts is fixed to the movable portion.

6. An electronic device comprising the acceleration detector according to claim 5.

7. An acceleration detecting device comprising:
    the acceleration detector according to claim 1; and
    a package which houses the acceleration detector.

8. An electronic device comprising the acceleration detector according to claim 1.

9. An inclination sensor comprising:

a base portion;

a plate-like movable portion connected to the base portion via a joint portion;

a gravitational acceleration detecting element laid over the base portion and the movable portion;

a supporting portion having a part extending along the movable portion from the base portion, as viewed in a plan view; and a mass portion arranged on at least one of two main surfaces of the movable portion in such a manner that a part of the mass portion overlaps the supporting portion, as viewed in a plan view;

wherein a space is provided between the mass portion and the supporting portion in an area where the mass portion and the supporting portion overlap each other so that the movable portion is displaceable about the joint portion as a fulcrum in a direction intersecting the main surface according to a gravitational acceleration applied in the direction intersecting the main surface.

10. The inclination sensor according to claim 9, wherein the supporting portion is in a frame shape surrounding the movable portion together with the base portion, as viewed in a plan view.

11. An inclination sensor device comprising:
the inclination sensor according to claim 10; and
a package which houses the inclination sensor.

12. The inclination sensor according to claim 9, wherein the supporting portion has plural fixed portions, and the inclination sensor has a center of gravity situated within a range formed by connecting the fixed portions that are next to each other or on a straight line formed by connecting the fixed portions that are next to each other, as viewed in a plan view.

13. The inclination sensor according to claim 9, wherein the gravitational acceleration detecting element includes a gravitational acceleration detecting portion having at least one or more resonating beam which extends along a direction connecting the base portion and the movable portion, and a pair of basal parts connected to both ends of the gravitational acceleration detecting portion, and one of the basal parts is fixed to the base portion and the other of the basal parts is fixed to the movable portion.

14. An electronic device comprising the inclination sensor according to claim 13.

15. An inclination sensor device comprising:
the inclination sensor according to claim 9; and
a package which houses the inclination sensor.

16. An electronic device comprising the inclination sensor according to claim 9.

* * * * *